(12) United States Patent
Sitzler et al.

(10) Patent No.: US 7,301,758 B2
(45) Date of Patent: *Nov. 27, 2007

(54) MOTOR-VEHICLE SEAT-BACK STORAGE COMPARTMENT

(75) Inventors: Wolfgang Sitzler, Wuppertal (DE); Jürgen Salewski, Düsseldorf (DE); Alexander Reisinger, Langenfeld (DE)

(73) Assignee: BOS GmbH & Co. KG, Ostfildern (DE)

( * ) Notice: Subject to any disclaimer, the term of this patent is extended or adjusted under 35 U.S.C. 154(b) by 232 days.

This patent is subject to a terminal disclaimer.

(21) Appl. No.: 10/994,159

(22) Filed: Nov. 18, 2004

(65) Prior Publication Data

US 2005/0151398 A1 Jul. 14, 2005

(30) Foreign Application Priority Data

Nov. 19, 2003 (DE) ................................ 103 54 162

(51) Int. Cl.
*G06F 1/16* (2006.01)
(52) U.S. Cl. ....................... 361/681; 361/679
(58) Field of Classification Search ................ 361/679, 361/681

See application file for complete search history.

(56) References Cited

U.S. PATENT DOCUMENTS

| 6,398,284 | B1 | 6/2002 | Butz |
| 6,484,915 | B2 | 11/2002 | Butz |
| 6,719,343 | B2 * | 4/2004 | Emerling et al. ........ 296/24.34 |
| 2002/0135211 | A1 | 9/2002 | Sitzler |
| 2002/0163215 | A1 | 11/2002 | Emerling |

FOREIGN PATENT DOCUMENTS

| DE | 4102646 | 8/1992 |
| DE | 29803305 | 10/1998 |
| DE | 19924921 | 12/2000 |
| EP | 0893306 | 1/1999 |

* cited by examiner

*Primary Examiner*—Yean-Hsi Chang
(74) *Attorney, Agent, or Firm*—Andrew Wilford

(57) ABSTRACT

A storage compartment for a motor-vehicle partition has an annular vehicle frame set in the partition, a container set in the vehicle frame and having an open side, and a mount releasably retaining the container in the vehicle frame. A cover fittable over the open side is adapted to carry a piece of vehicular accessory equipment, e.g. a cup holder, DVD or CD player, or the like.

9 Claims, 4 Drawing Sheets

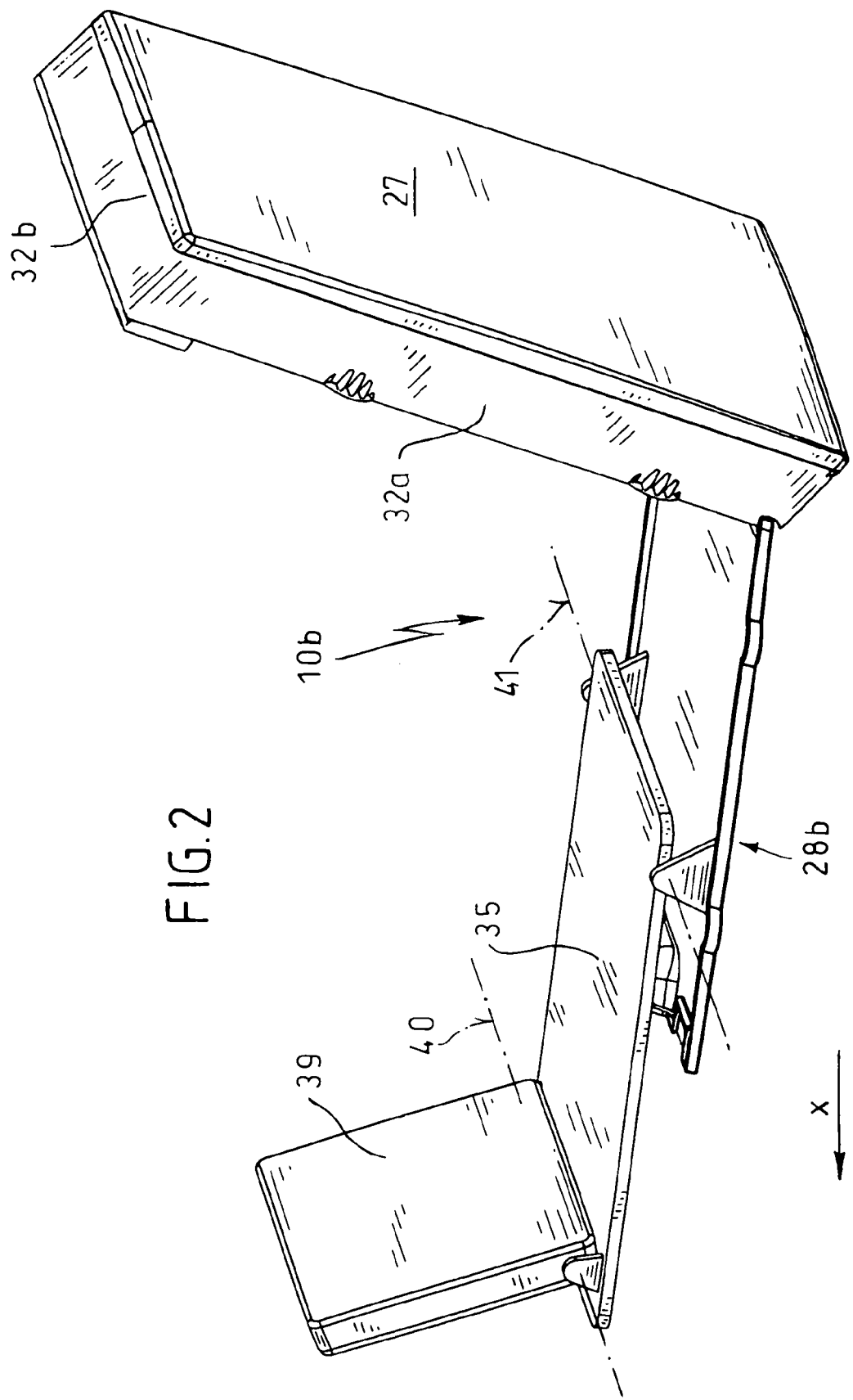

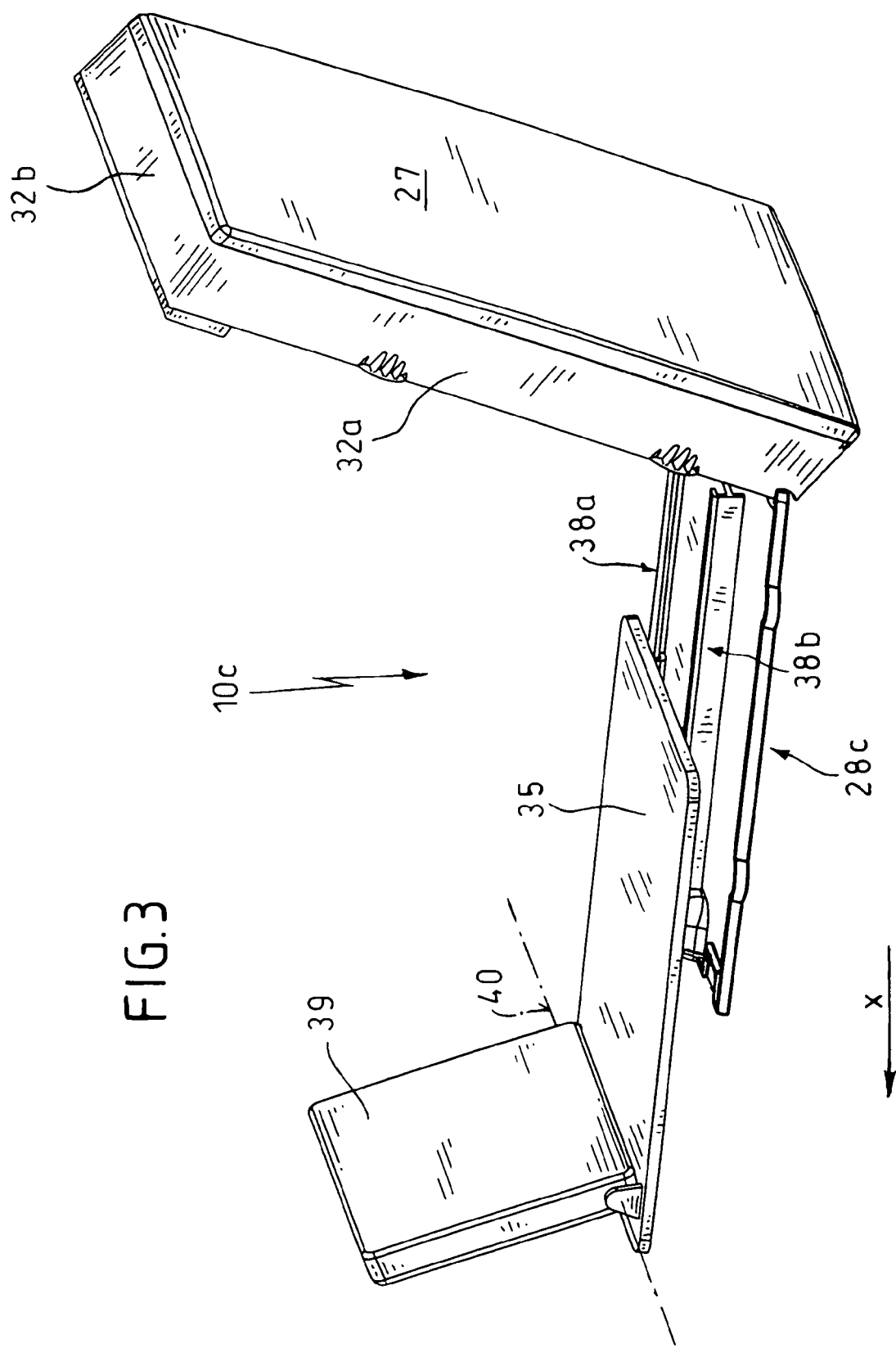

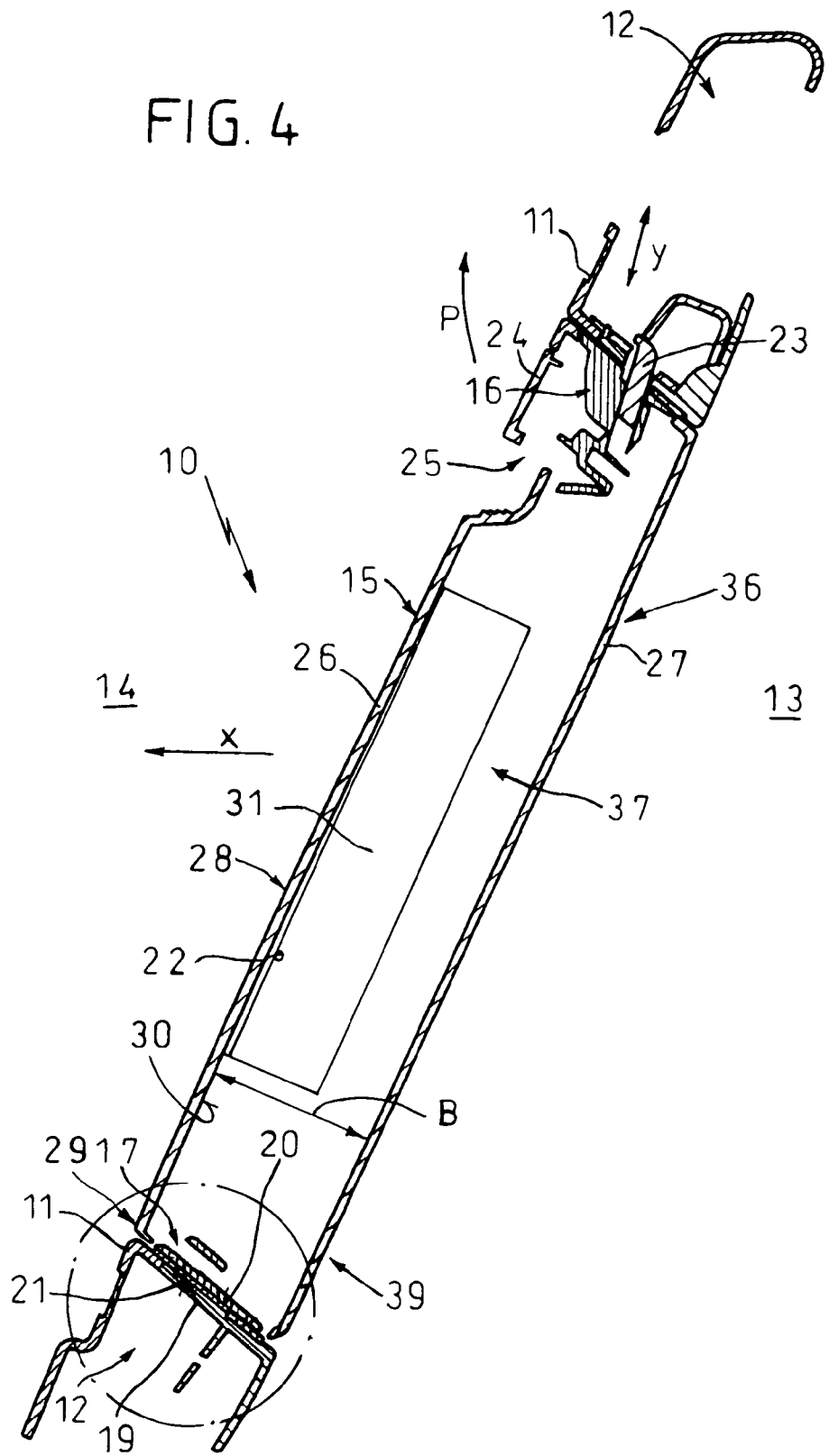

US 7,301,758 B2

MOTOR-VEHICLE SEAT-BACK STORAGE COMPARTMENT

FIELD OF THE INVENTION

The present invention relates to storage compartment. More particularly this invention concerns such a storage compartment that is built into a partition or seat back of a motor vehicle.

BACKGROUND OF THE INVENTION

U.S. Pat. No. 6,398,284 describes a transport container for a motor vehicle having a partition between two compartments. The container has a generally rectangular vehicle frame set in the partition and having generally parallel longitudinal members and generally parallel transverse members interconnecting ends of the longitudinal members and defining therewith an opening. A generally rectangular device frame fittable in the opening of the vehicle frame has generally parallel longitudinal members and generally parallel transverse members interconnecting ends of the respective longitudinal members. Respective pivot formations on the vehicle frame between the vehicle-frame longitudinal members define a pivot axis parallel to and between the vehicle-frame longitudinal members. Respective pivot formations on the device frame between and parallel to the device-frame longitudinal members and fittable to the respective vehicle-frame pivot formations allow pivoting of the device frame into a mounted position set in the vehicle frame with the members of the device frame closely juxtaposed with the respective members of the vehicle frame and the frames in direct contact with each other at abutment locations offset from the axis. A latch offset from the axis releasably secures the device frame in the mounted position in the vehicle frame.

U.S. Pat. No. 6,484,915 describes another transport container accessory for incorporation in a vehicle seat or trunk wall structure. This container comprises a fastening frame having a throughgoing opening forming a passthrough into a trunk of a vehicle, a holding frame of a container positionable on and removable from the fastening frame, and a locking element movable in a guide on the fastening frame and provided with a formation engageable with the holding frame for releasably retaining the holding frame on the fastening frame. A spring engaged with one side of the locking element applies a spring force thereto. A tractive element engaged at one end with another side of the locking element is maintained under tension by the spring force. An actuating member acting on the tractive element between ends thereof draws the locking element against the spring force into a position wherein the holding frame is released by the formation.

These systems are fairly convenient, but are susceptible of improvement. In particular the existing such compartments are not readily adaptable to different uses, in particular to housing DVD players and their displays. Furthermore it is extremely difficult or impossible for a vehicle owner or even a car dealer to change the use of such a seat-back storage compartment.

OBJECTS OF THE INVENTION

It is therefore an object of the present invention to provide an improved motor-vehicle seat-back storage compartment.

Another object is the provision of such an improved motor-vehicle seat-back storage compartment that overcomes the above-given disadvantages, in particular that has widespread use.

SUMMARY OF THE INVENTION

A storage compartment for a motor-vehicle partition has according to the invention an annular vehicle frame set in the partition, a container set in the vehicle frame and having an open side, and a mount releasably retaining the container in the vehicle frame. According to the invention a cover fittable over the open side is adapted to carry a piece of vehicular accessory equipment.

The invention is therefore an improvement on the system of above-cited U.S. Pat. No. 6,398,284 in that the cover is adapted for use of a vehicle accessory, for instance a cup holder, media player, or the like. The cover can be moved from a stowed position tucked into the pass-through space occupied by the compartment to an extended use position in which the accessory mounted on the deployed cover can be used. Not only does the cover function integrally with the motor-vehicle accessory housed in the seat-back storage compartment, but it can easily be switched, even by the vehicle owner, when the application changes. Thus the vehicle operator can snap out a cover that serves, for example, as a cup holder, and snap in one with a CD or DVD player, or even a small refrigerator, for use during a trip, with the insert being movable from vehicle to vehicle or removable when the season changes, as for instance swapping out a ski bag for winter use with a refrigerator for summer use.

According to the invention a latch is provided for releasably retaining the cover on the container.

In accordance with the invention the cover is provided with a movable panel carrying the piece of equipment which is a video screen. This panel can pivot or slide on the cover. The piece of equipment can also pivot on the panel.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 2 and 3 are views like FIG. 1 of further such storage compartments in accordance with the invention; and FIG. 4 is a vertical section through yet another compartment according to the invention.

SPECIFIC DESCRIPTION

Figure 1:
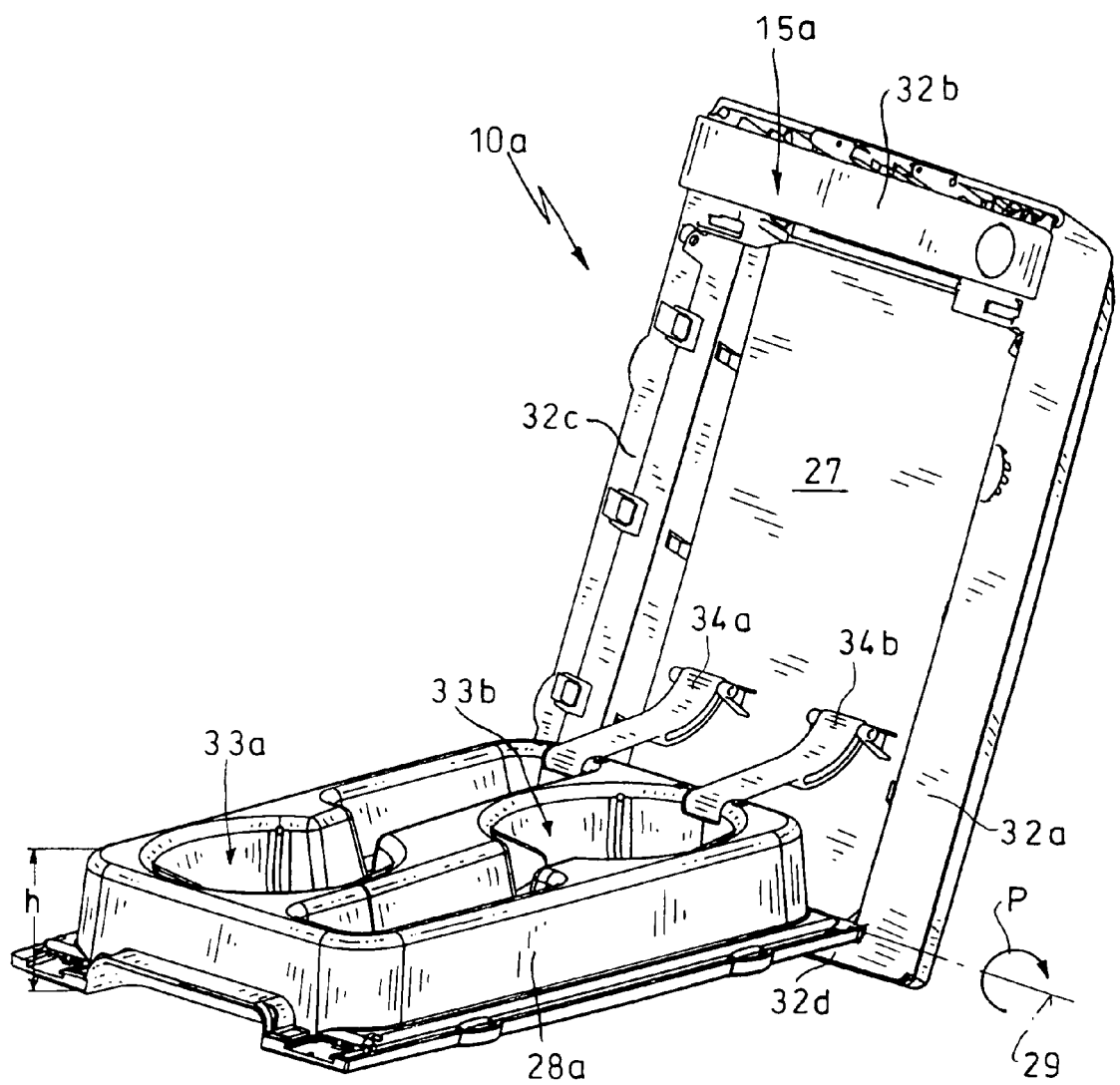
FIG. 1 is a perspective view of a seat-back storage compartment according to the invention.

As seen in FIG. 4 a storage compartment 10 is set in a frame 11 fixed in a seat back 12 between a rear trunk compartment 13 and a back-seat passenger compartment 14 of a vehicle moving in a normal travel direction x. The frame 11 is, as described in above-cited U.S. Pat. No. 6,398,284 whose disclosure is herewith incorporated by reference, generally rectangular with a pair of long and parallel side members lying in vertical planes and short top and bottom members extending horizontally between and bridging the upper and lower ends of the side members. This frame 11 is permanently mounted in the seat back 12 and forms a passage extending through the seat back in the direction x.

An insert or container 36 held in the frame 11 comprises an inner device frame 15 of the same shape as the frame 11 but fitted within it and having an upper end 16 provided with a latch element 23 movable as shown by double arrow y by a handle 24 to lock the upper part 16 to the frame 11. A cutout 25 allows the user to get his or her fingers under the handle 24 to pull it out toward the compartment 14 and up and thereby retract the latch element 23 downward out of the frame 11.

At its lower end 17 the container 36 is pivoted on the frame 11 about an axis 22. The container 36 can be fitted by movement against the direction x into the frame 11 until its lower edge 21 bears on the inner edge 20 of a lower member 19 of the frame 11. Once the surfaces 20 and 21 engage each other, the latch element 23 will snap into place under spring force and lock the container 36 into the frame 11. A latch element like the element 23 could also be provided at the lower end 17.

The insert has a front wall 26 and a rear wall 27 that together define an interior space 37. The front wall 26 is formed by cover 28 that is pivoted at 29 so it can be swung away from the rear wall 27 for access to the space 37, but not completely separated from the container 36. An inside face 30 of the cover 28 carries a motor vehicle accessory, e.g. a piece 31 of electronic equipment that can be, for example, a DVD, CD, or videocassette player, or even a small refrigerator or cup holder. A latch like that securing the container 36 in the frame 11 is provided at the upper end of the cover 28 to releasably retain it to the container 36

FIG. 1 shows a system wherein the device frame 15a is comprised of four members 32a, 32b, 32c, and 32d. The cover 28a is formed as a cup holder with two seats 33a and 33b adapted to hold cups, glasses, bottles, cans, or the like. A height or depth h of the cover 28a is equal to a depth B (FIG. 4) of the cavity or space 37, so that anything set in the relatively deep seats 33a and 33b will be very stable.

Two restraining straps 34a and 34b extend between the back wall 27 of the compartment 10a and the cover 28a so that, when the cover 28a is down as illustrated, it will be stable in a horizontal deployed position, even if not supported from beneath by an armrest or seat. Otherwise the structure of FIG. 1 is identical to that of FIG. 4.

In both FIGS. 2 and 3, compartments 10b and 10c are shown having on the respective covers 28b and 28c a main support plate 35, which can carry, for example, a DVD player. In FIG. 2 it is pivoted about an axis 41 on the cover 28b, and in FIG. 3 it can slide on rails 38a and 38b parallel to the cover 28c. The plates 34 each carry a screen 39 pivotal about an axis 40. Thus the covers 28a and 28b can be pivoted down and the plates 35 can either be slid or pivoted out, and the screens 39 tipped up to allow a user in a seat adjacent the compartment 10b or 10c to see the display 39. It would also be possible to provide means for moving the display 39 transversely of the direction x, or vertically.

We claim:

1. In a motor vehicle having a generally vertical partition, a storage compartment comprising:
    an annular vehicle frame permanently mounted in the partition and having a pair of side members lying in a generally vertical plane and horizontal top and bottom members bridging top and bottom ends of the side members;
    a container set in the vehicle frame and having a generally horizontally open side;
    mounting means releasably retaining the container in the vehicle frame; and
    a cover releasably secured over the open side and provided with a mount adapted to mount a piece of vehicular accessory equipment.

2. The storage compartment defined in claim 1, further comprising
    first latch means for releasably retaining the cover on the container.

3. The storage compartment defined in claim 1 wherein the cover is provided with a movable panel carrying the piece of equipment which is a video screen.

4. The storage compartment defined in claim 3 wherein the movable panel can pivot on the cover.

5. The storage compartment defined in claim 3 wherein the movable panel can slide on the cover.

6. The storage compartment defined in claim 3 wherein the piece of equipment can pivot on the panel.

7. The storage compartment defined in claim 1 wherein the container fits complementarily in the vehicle frame and is provided with second latch means separate from the first latch means for releasably retaining the cover to the front side.

8. The storage compartment defined in claim 7 wherein the container has one end that fits with the vehicle-frame bottom member and the first latch means clips the container to the vehicle-frame top member.

9. The storage compartment defined in claim 1 wherein the piece of vehicular accessory equipment is removably carried via the mount on the cover.

* * * * *